United States Patent
Alperovich

(10) Patent No.: US 6,175,741 B1
(45) Date of Patent: Jan. 16, 2001

(54) SYSTEM AND METHOD FOR ENHANCING BUSINESS CARD SERVICES WITHIN A CELLULAR NETWORK

(75) Inventor: Vladimir Alperovich, Dallas, TX (US)

(73) Assignee: Ericsson Inc., Research Triangle Park, NC (US)

( * ) Notice: Under 35 U.S.C. 154(b), the term of this patent shall be extended for 0 days.

(21) Appl. No.: 09/223,063

(22) Filed: Dec. 30, 1998

(51) Int. Cl.$^7$ ....................................................... H04Q 7/20
(52) U.S. Cl. ............................................. 455/458; 455/466
(58) Field of Search ..................................... 455/432, 433, 455/435, 445, 458, 466, 451, 412

(56) References Cited

U.S. PATENT DOCUMENTS

| | | | |
|---|---|---|---|
| 5,440,559 | * | 8/1995 | Gaskill .................................. 370/95.1 |
| 5,920,826 | * | 7/1999 | Metso et al. ......................... 455/557 |
| 6,084,951 | * | 7/2000 | Smith et al. ....................... 379/93.17 |

* cited by examiner

Primary Examiner—Reinhard J. Eisenzopf
Assistant Examiner—N. Mehvpour
(74) Attorney, Agent, or Firm—Jenkens & Gilchrist, P.C.

(57) ABSTRACT

A telecommunications system and method is disclosed for enhancing business card services implemented within cellular networks to provide additional features to mobile subscribers. Business card information associated with a mobile subscriber can be stored within a mobile station (MS) of the mobile subscriber and transmitted by a business card application within the MS through the cellular network to another MS that has the business card application. The business card application within the sending MS records the telephone number of each receiving MS as historical data. When a change is made to the business card information, the business card application within the sending MS transmits updates to all or some of the MS's that received the business card before the change was made by using the historical data. In addition, the business card application can interface with existing supplementary services to tailor the supplementary services to the individual mobile subscriber.

34 Claims, 12 Drawing Sheets

SYSTEM AND METHOD FOR ENHANCING BUSINESS CARD SERVICES WITHIN A CELLULAR NETWORK

BACKGROUND OF THE PRESENT INVENTION

1. Field of the Invention

The present invention relates generally to telecommunications systems and methods for providing business card services to mobile subscribers within a cellular network, and specifically to enhancing features provided by business card services within a cellular network.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR 14/16 that controls the LA 18. Each Location Area 12 is divided into a number of cells 22.

Mobile Station (MS) 20 is the physical equipment, e.g., a car phone or other portable phone, used by mobile subscribers to communicate with the cellular network 10, each other, and users outside the subscribed network, both wireline and wireless. The MS 20 may also include a Subscriber Identity Module (SIM) card 200, or other memory, which provides storage of subscriber related information, such as a subscriber authentication key, temporary network data, and service related data, such as language preference.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTSs 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the MSs 20 currently located within the MSC/VLR area 12. If an MS 20 roams into a new MSC/VLR area 12, the MSC 14 will request data about that MS 20 from the HLR database 26 (simultaneously informing the HLR 26 about the current location of the MS 20) and store the data in the VLR 16 connected to that MSC 14. Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Today, a number of non-mobile held devices support business card applications for storing business cards in electronic form. The information from a business card can include the person's name, fax and telephone number and e-mail address. In addition, recent developments have proposed implementing such business card applications within mobile devices, such as an MS 20. The business card information can be stored within, for example, the SIM card 200, and can be accessed to initiate an outgoing call to a selected person's telephone number, fax number, or, alternatively, to the selected person's e-mail address through the Internet.

However, the utilization of such mobile-based business card applications has been limited to the storage and retrieval of the business card information. In today's society, with the mobility of employees between various employers, business card information can change rapidly. Instead of providing a hard copy of such business card information each time the information changes, which must be manually entered into the mobile-based business card application, it would be more convenient to store such information in the mobile-based business card application, transmit the information over the cellular network to each desired subscriber that has this business card application, and re-transmit the information if any changes are made without having to remember each subscriber that the information was initially sent to.

Furthermore, with the increase in available supplementary services, such as call forwarding, call blocking, caller ID, call priority, positioning and conference calling, it would be advantageous to utilize the business card information to tailor these supplementary services to the individual subscriber.

It is, therefore, an object of the present invention to enhance business card services within the cellular network to provide additional features to mobile subscribers.

SUMMARY OF THE INVENTION

The present invention is directed to telecommunications systems and methods for enhancing business card services implemented within cellular networks to provide additional features to mobile subscribers. Business card information associated with a mobile subscriber can be stored within a memory within a mobile station (MS) of the mobile subscriber. This business card information can be transmitted by a business card application within the MS through the cellular network to another MS that has the business card application for receiving, storing, sorting and displaying the information. The business card application within the sending MS can record the telephone number of each receiving MS as historical data. This historical data can later be used when a change is made to the business card, for example, the address, company name, or telephone number, of the mobile subscriber changes. The business card application within the sending MS can transmit updates to all or some of the MSs that received the business card before the change was made by using this historical data. In addition, the business card application can interface with existing supplementary services, such as call forwarding, call blocking, caller ID, call priority, positioning and multiparty calling to tailor the supplementary services to the individual mobile subscriber.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
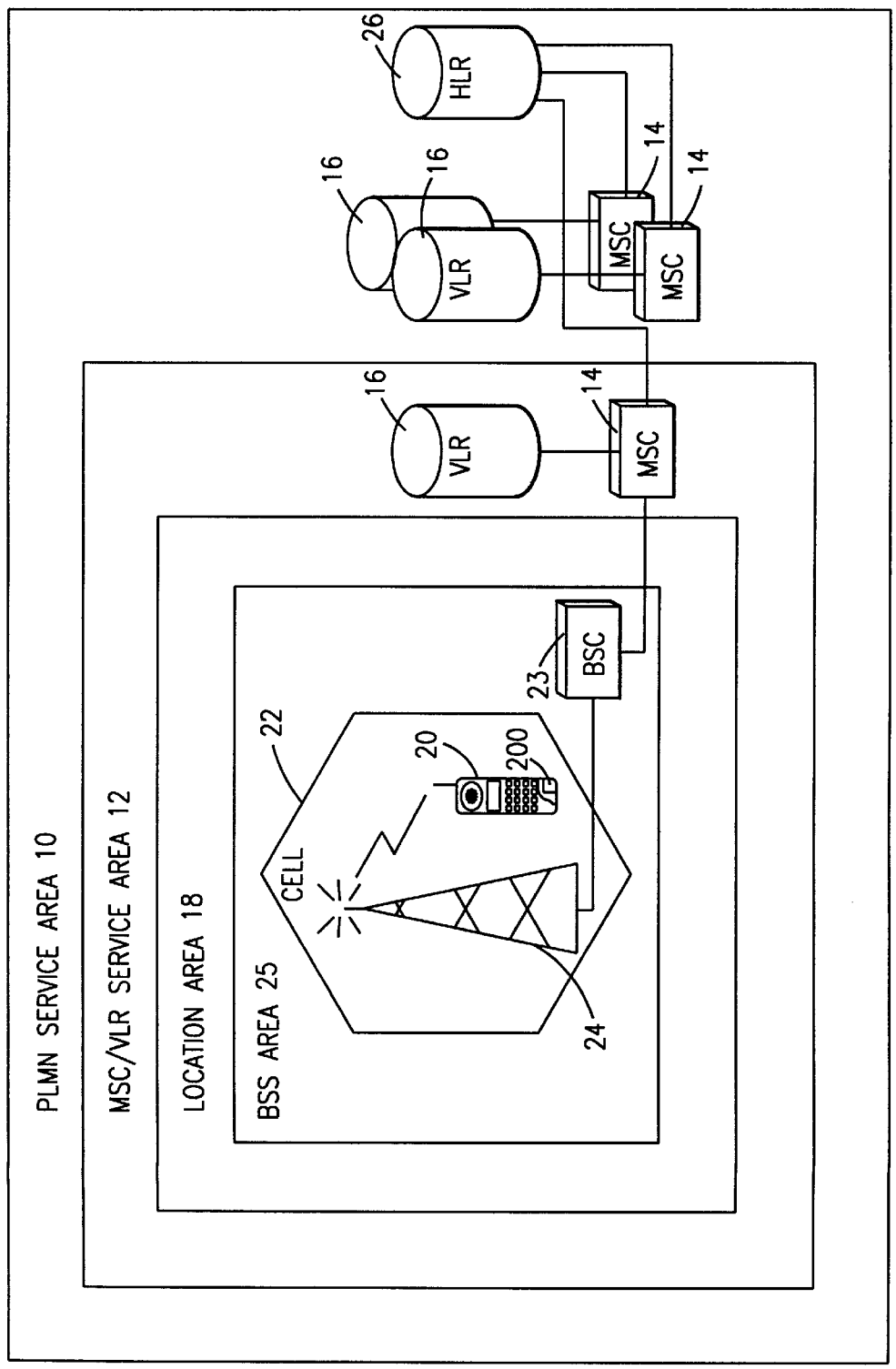
FIG. 1 is a block diagram of a conventional wireless telecommunications system.
Figure 2:
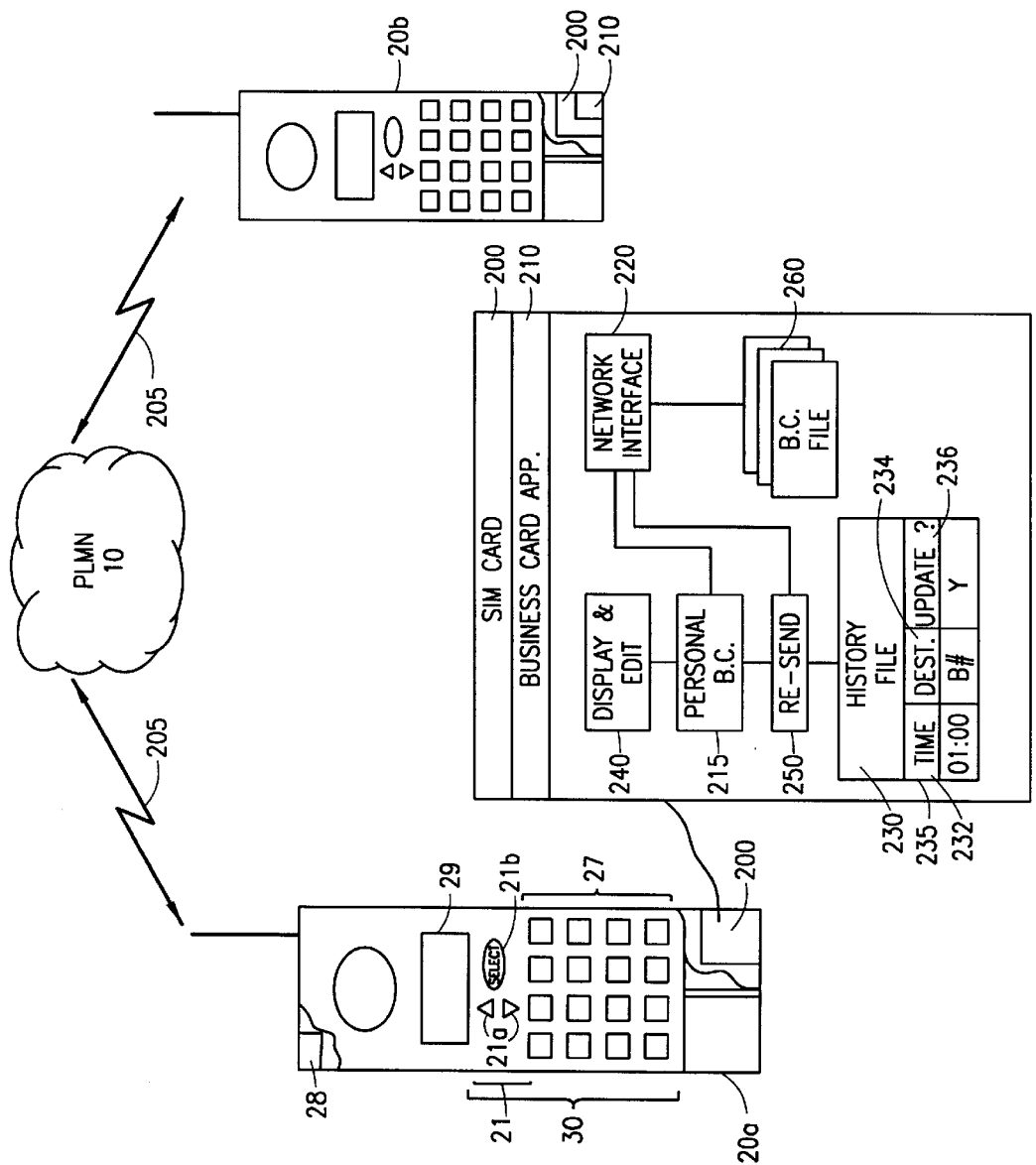
FIG. 2 illustrates a business card application within a mobile station for maintaining historical data and transmitting updates of business card information to other mobile stations by using this historical data in accordance with preferred embodiments of the present invention.

With reference now to FIG. 2 of the drawings, enhanced business card services can be provided to mobile subscribers within a cellular network 10 by implementing an enhanced business card application (functionality) 210 within a memory 200, for example, a Subscriber Identity Module (SIM) card, within a mobile station (MS) 20a. Business card information 215 associated with a mobile subscriber, such as the mobile subscriber's name, company name, title, address, telephone number, fax number and e-mail address, can be stored in the business card application 210 within the SIM card 200 of the MS 20a belonging to the mobile subscriber.

The mobile subscriber can send the business card information 215 to other MS's 20b that have the business card application 210 therein by using a network interface application 220 within the business card application 210. The mobile subscriber can request the personal business card information 215 to be sent to a receiving MS 20b by accessing the business card application 210 and selecting a sending option, using, for example, function keys 21 on a keypad 30 of the sending MS 20a. In response to receiving the sending request, the business card application 210 will prompt the mobile subscriber for the B-number of the receiving MS 20b.

Once the business card application 210 receives the dialed B-number, the business card application 210 retrieves the business card information 215 associated with the sending mobile subscriber and sends this information 215 to the network interface application 220. The network interface application 220 sends this information 215 to transceiver circuitry 28 within the sending MS 20 for transmission of the information 215 over an air interface 205 to the receiving MS 20b via the cellular network 10. Each time the sending MS 20a sends its personal business card information 215 to a receiving MS 20b, the business card application 210 updates historical data 235 within a history file 230 of the business card application 210 by logging the transmission in the history file 230, and recording the time 232 of the transmission and the destination 234, e.g., B-number of the receiving MS 20b.

Figure 3:
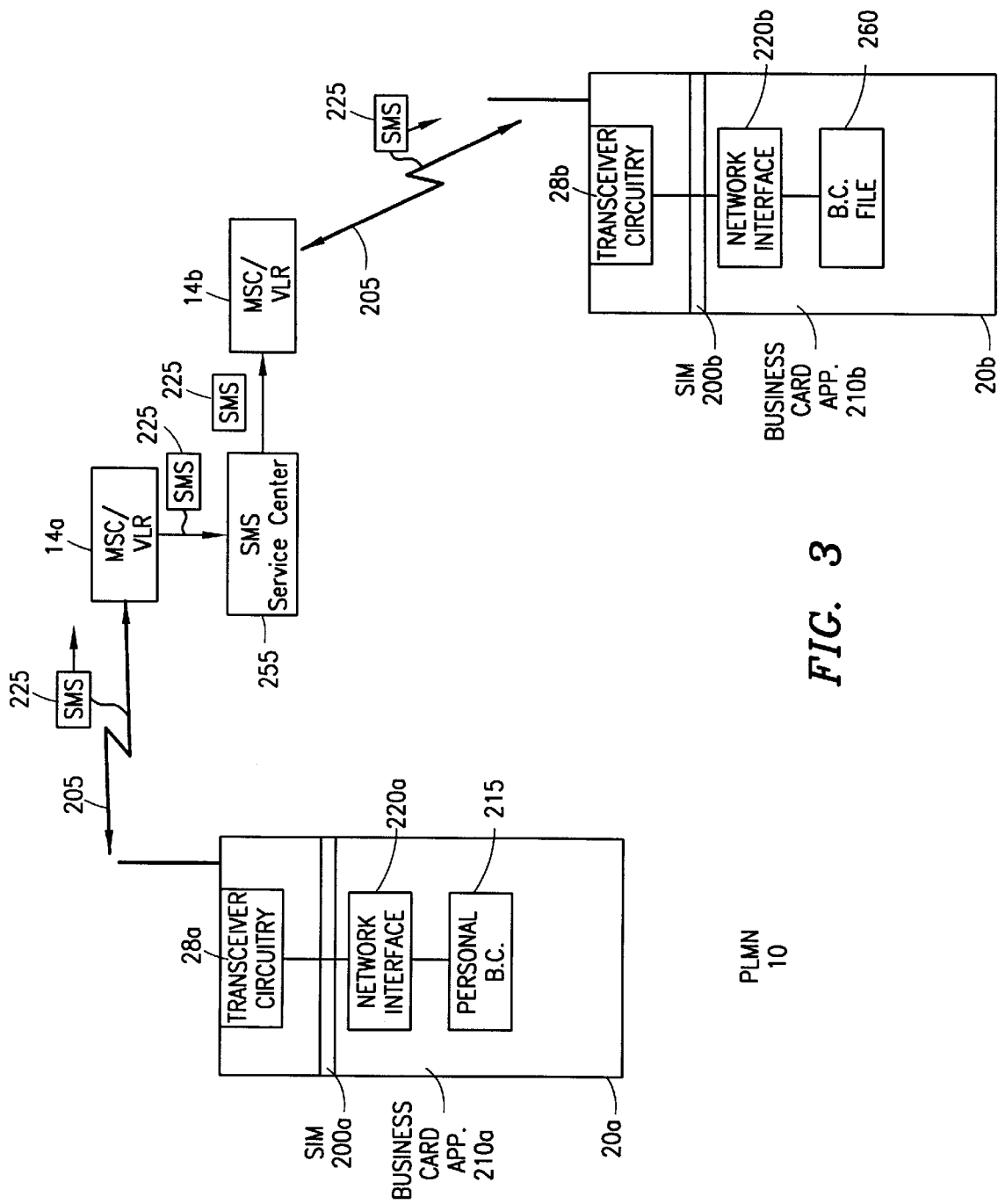
FIG. 3 illustrates the transmission of business card information using Short Message Service messages.

The information 215 can be transmitted through the cellular network 10 to the receiving MS 20b using an existing mechanism, such as Short Message Service (SMS). For example, as shown in FIG. 3 of the drawings, the network interface application 220a within the sending MS 20a can translate the business card information 215 into an SMS message 225 and send the SMS message 225 to the transceiver circuitry 28a within the MS 20a for transmission of the SMS message 225 over the air interface 205 to an SMS Service Center 255 within the cellular network 10 via a serving Mobile Switching Center/Visitor Location Register (MSC/VLR) 14a. The SMS Service Center 255 can route the SMS message 225 to an MSC/VLR 14b serving the receiving MS 20b, which can subsequently transmit the SMS message 225 to the receiving MS 20b over the air interface 205. Transceiver circuitry 28b within the receiving MS 20b can receive the SMS message 225 and send it to the network interface application 220b within the receiving MS 20b, which can convert the SMS message 225 back into the business card information 215 of the sending MS 20a and store the information 215 in a business card file 260 within the business card application 210 of the receiving MS 20b.

Referring again to FIG. 2 of the drawings, a display and edit application 240 within the business card application 210 allows the mobile subscriber to display the business card information 215 on a display 29 of the MS 20a and make changes to it using the function keys 21 and numbers 27 on the keypad 30 of the MS 20a. For example, if the mobile subscriber needs to change the company name information, the display and edit function 240 can display the alphabet and other characters on the MS display 29 for the mobile subscriber to choose from. The mobile subscriber can select the particular letters for the new company name by scrolling through the displayed alphabet using, for example, up and down arrow keys 21a and picking the particular letter or character using a select key 21b. This new personal business card information 215 is stored in the business card application 210 within the SIM card 200 of the MS 20a.

When the mobile subscriber makes such a change to the business card information 215, the business card application 210 can send updates to all or some of the parties who received the business card information 215 before the change was made. The mobile subscriber can request the re-sending of the updated business card information 215, or alternatively and preferably, the business card application 210 can automatically re-send the information 215 upon an update. A re-send application 250 accesses the history file 230 and re-sends the updated business card information 215 to all (or some) of the parties who are listed in the history file 230 using the network interface application 220, as discussed hereinbefore.

The re-send criteria can be specified by the mobile subscriber and stored in the history file 230. For example, when the mobile subscriber first sends the business card information 215 to a receiving MS 20b, the business card application 210 can prompt the mobile subscriber to enter whether or not the mobile subscriber would like updates to be sent to the receiving MS 20b by using the function keys 21 on the keypad 30. If the mobile subscriber does want updates to be sent to the receiving MS 20b, the business card application 210 can store, along with the time 232 and destination 234 information in the historical data 235, an indication 236 that updates should be sent.

Figure 4:
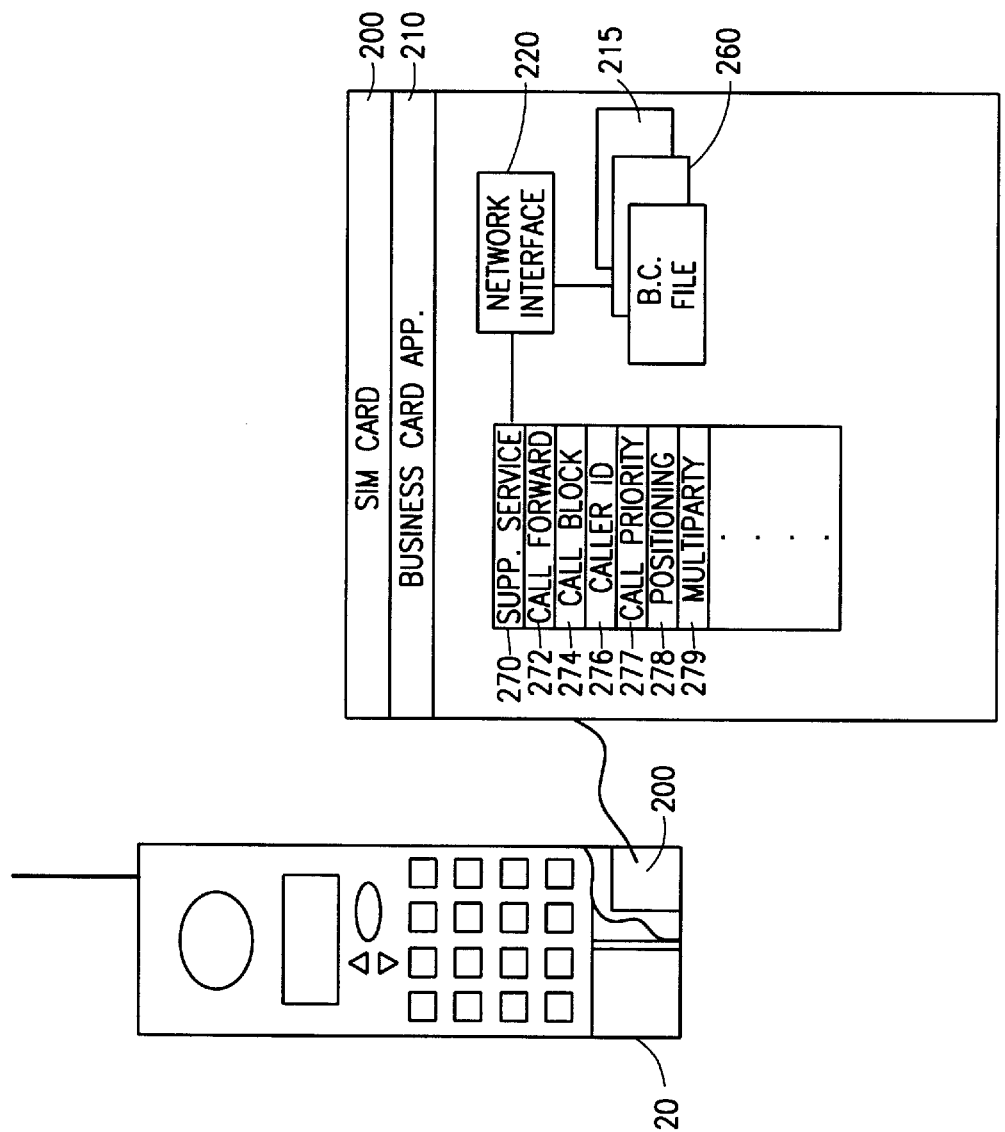
FIG. 4 illustrates a business card application within a mobile station for interfacing with existing supplementary services to tailor the supplementary services to the individual mobile station in accordance with embodiments of the present invention.

With reference now to FIG. 4 of the drawings, the business card application 210 can be further enhanced to provide customized supplementary services, such as call forwarding 272, call blocking 274, caller ID 276, call priority 277, positioning 278 and multiparty calling 279. As discussed previously, when an MS 20 receives business card information 215 from another subscriber via the network interface application 220, the business card information 215 is stored in the business card file 260 within the business card application 210 in the SIM card 200 of the MS 20. Once the information 215 is stored, the subscriber can request new supplementary services based upon the information 215 stored in the business card file 260. A supplementary service application 270 within the business card application 210 can interface with the information 215 stored in the business card file 260 in order to screen, forward or otherwise treat incoming and outgoing calls.

Figure 5:
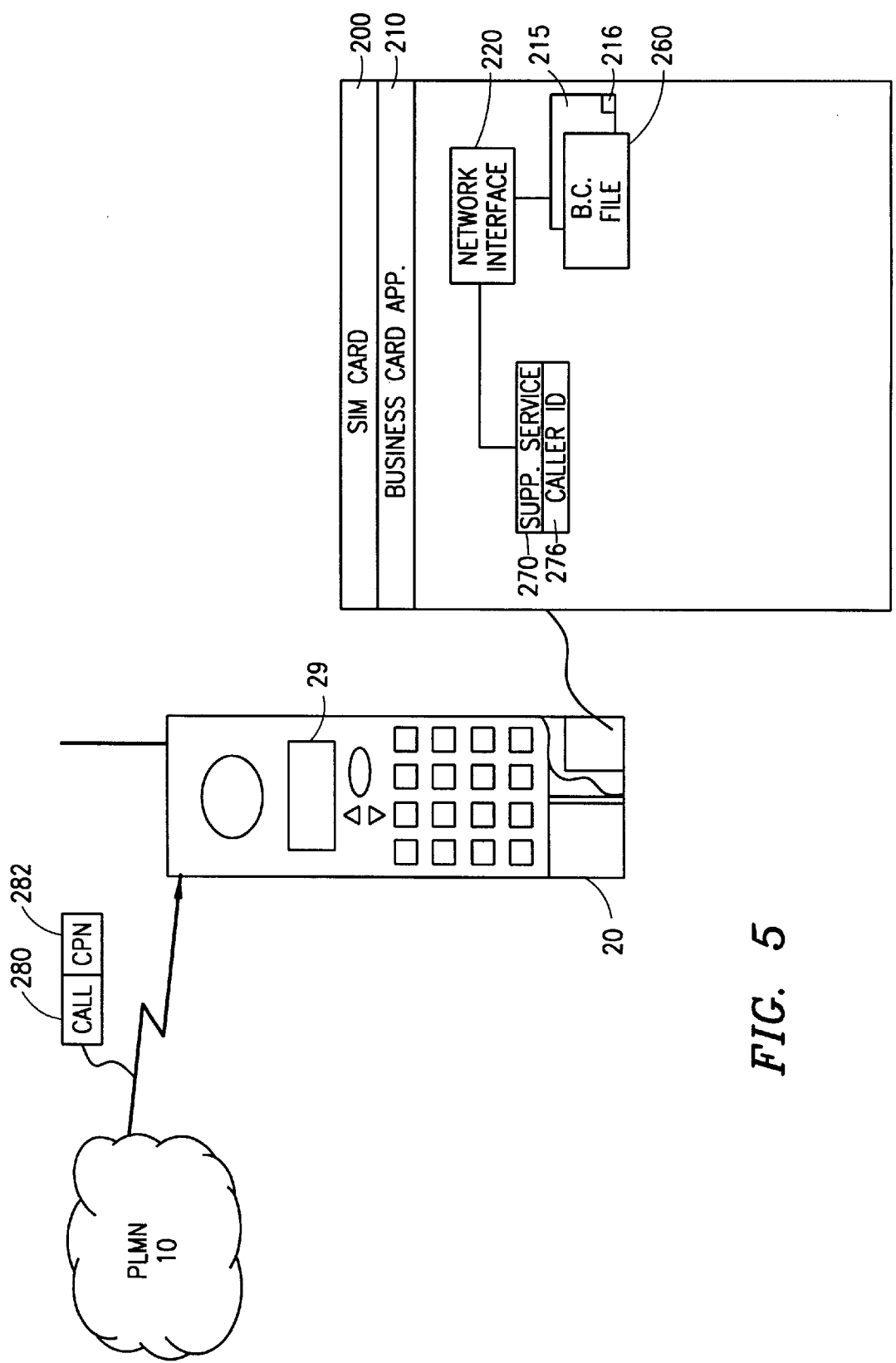
FIG. 5 illustrates a sample enhanced caller ID service utilizing business card information within a mobile station in accordance with embodiments of the present invention.

For example, with reference now to FIG. 5 of the drawings, if the MS 20 subscribes to caller ID services, when an incoming call 280 from the cellular network 10 is received by the MS 20, the caller ID interface 276 within the supplementary service application 270 can compare a received calling party number 282 with telephone numbers 216 within the business card information 215 stored in the business card file 260. If the received calling party number 282 matches one of the telephone numbers 216 in the business card file 260, the caller ID interface 276 within the supplementary service application 270 can display the entire business card information 215 associated with that telephone number 216 along with the calling party ID on the MS display 29 at the time of the incoming call 280. If the business card information 215 includes a graphic image (not shown), such as a picture of the calling party, this graphic image can also be displayed.

Figure 6:
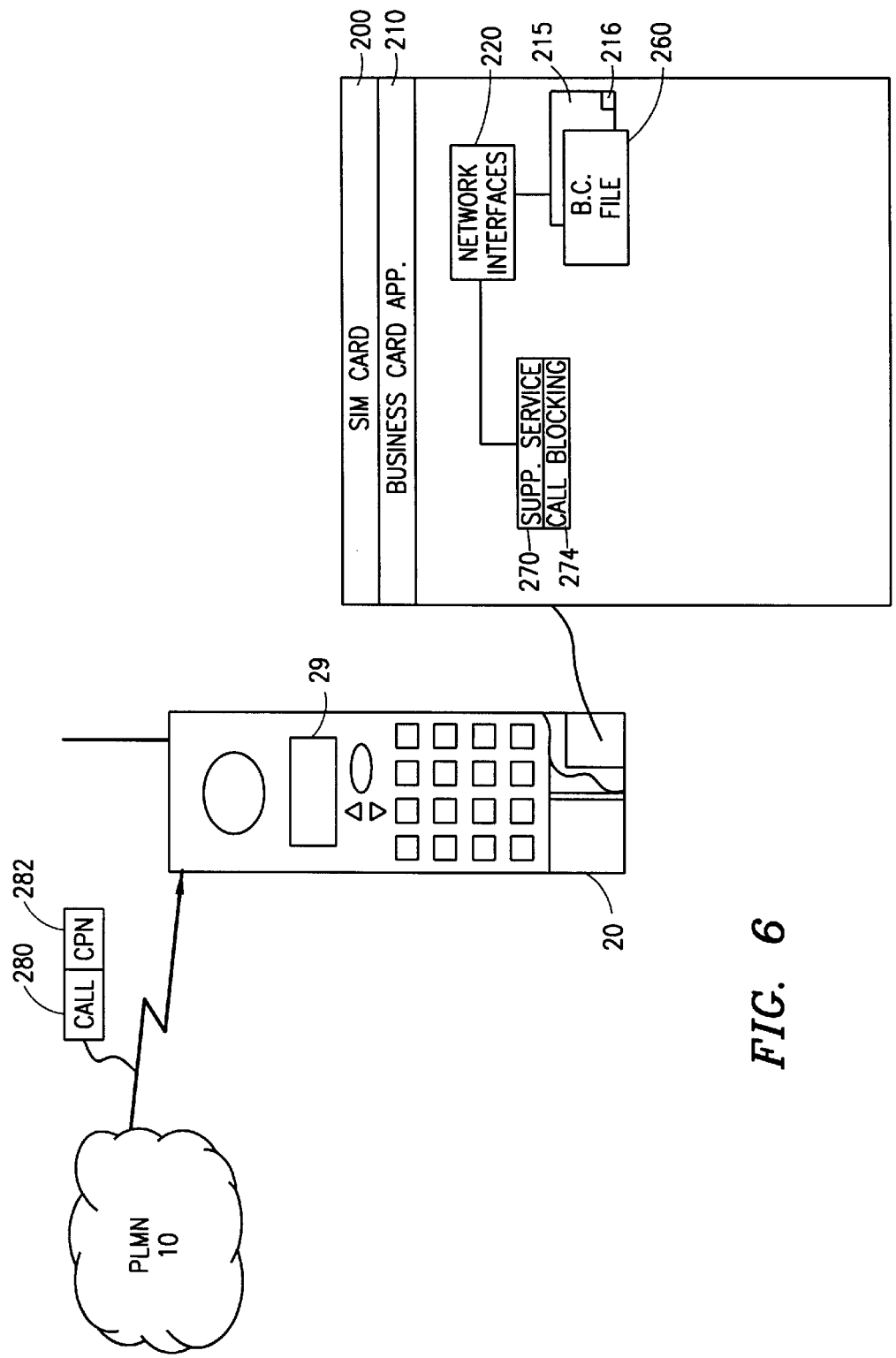
FIG. 6 illustrates a sample call blocking service utilizing business card information within a mobile station in accordance with embodiments of the present invention.

As another example, as shown in FIG. 6 of the drawings, the mobile subscriber can program the supplementary service application 270 to provide a call blocking feature by instructing the call blocking interface 274 within the supplementary service application 270 to compare the calling party number 282 with the telephone numbers 216 within the business card information 215 stored in the business card file 260. If the calling party number 282 does not match any one of the telephone numbers 216 stored in the business card file 260, the call blocking interface 274 within the supplementary service application 270 can block the incoming call. Therefore, if an incoming call is received from a blocked party, the MS 20 will not ring when the incoming call is received, and the call will be transferred to the mobile subscriber's voice mail.

Alternatively, the mobile subscriber can select one or more of the telephone numbers 216 stored in the business card file 260 that are either allowed or blocked. For example, the mobile subscriber can mark certain telephone numbers 216 belonging to important subscribers, such as family members, friends, or important business associates, as allowed. If the calling party number 282 matches one of the telephone numbers 216 marked as important, the call blocking interface allows the incoming call 280 to be received by the MS 20. Otherwise, the incoming call 280 is blocked and forwarded to the called mobile subscriber's voice mail or other forwarding number.

Figure 7:
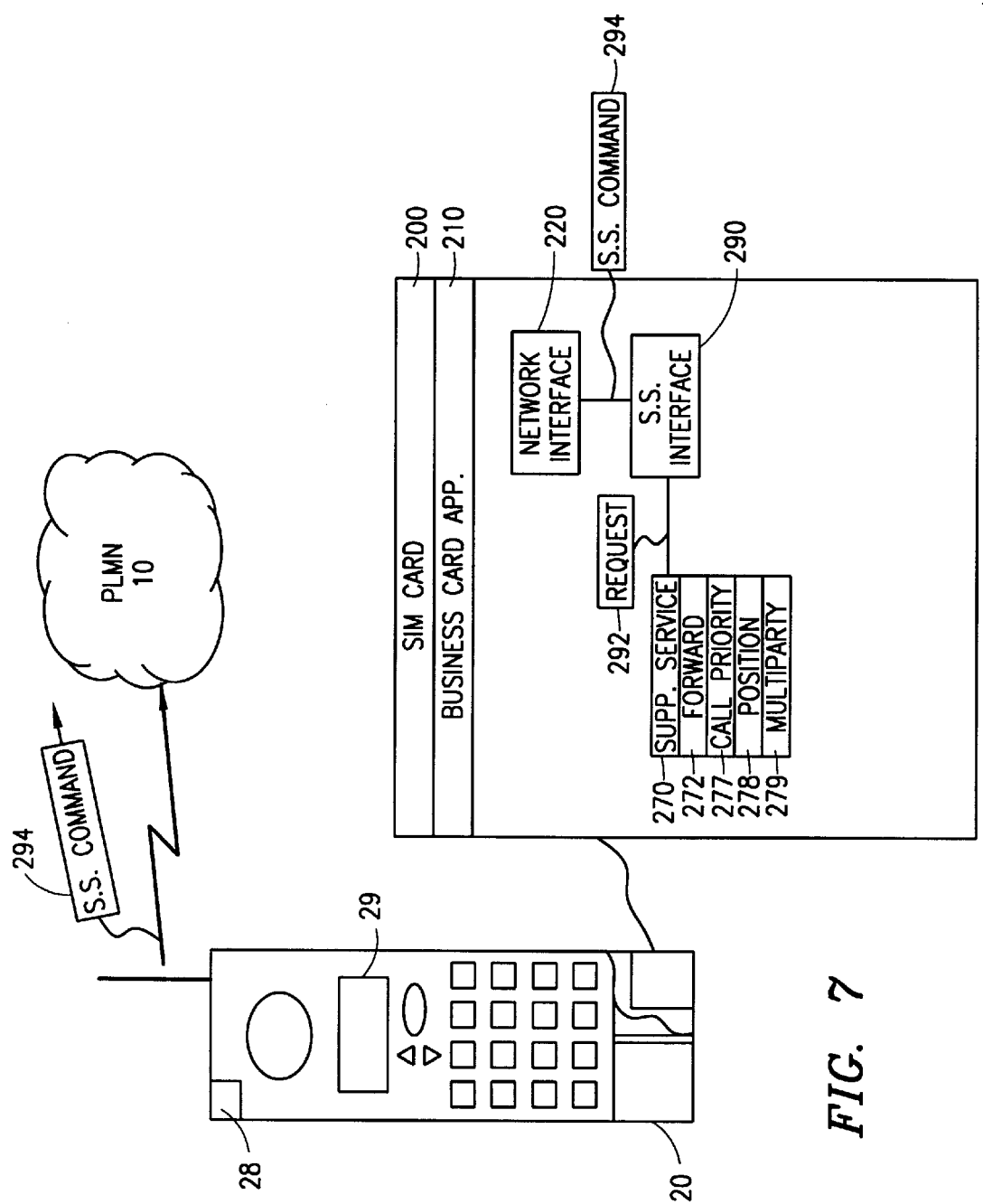
FIG. 7 illustrates the utilization of business card information to enhance network-based services in accordance with embodiments of the present invention.

Enhancing the caller ID service and providing call blocking service does not require any communication with the cellular network 10. These services can be implemented without the need for sending instructions to the cellular network 10. However, with reference now to FIG. 7 of the drawings, the supplementary service application 270 may also be used when the mobile subscriber invokes existing network supported supplementary services, such as call forwarding 272, positioning 278 or multiparty calling 279. A network supported supplementary service interface 290 can receive requests 292 from the supplementary service application 270, convert the requests 292 into the appropriate supplementary service commands 294 and transmit the supplementary service commands 294 to the cellular network 10 via the transceiver circuitry 28 within the MS 20.

Figure 8:
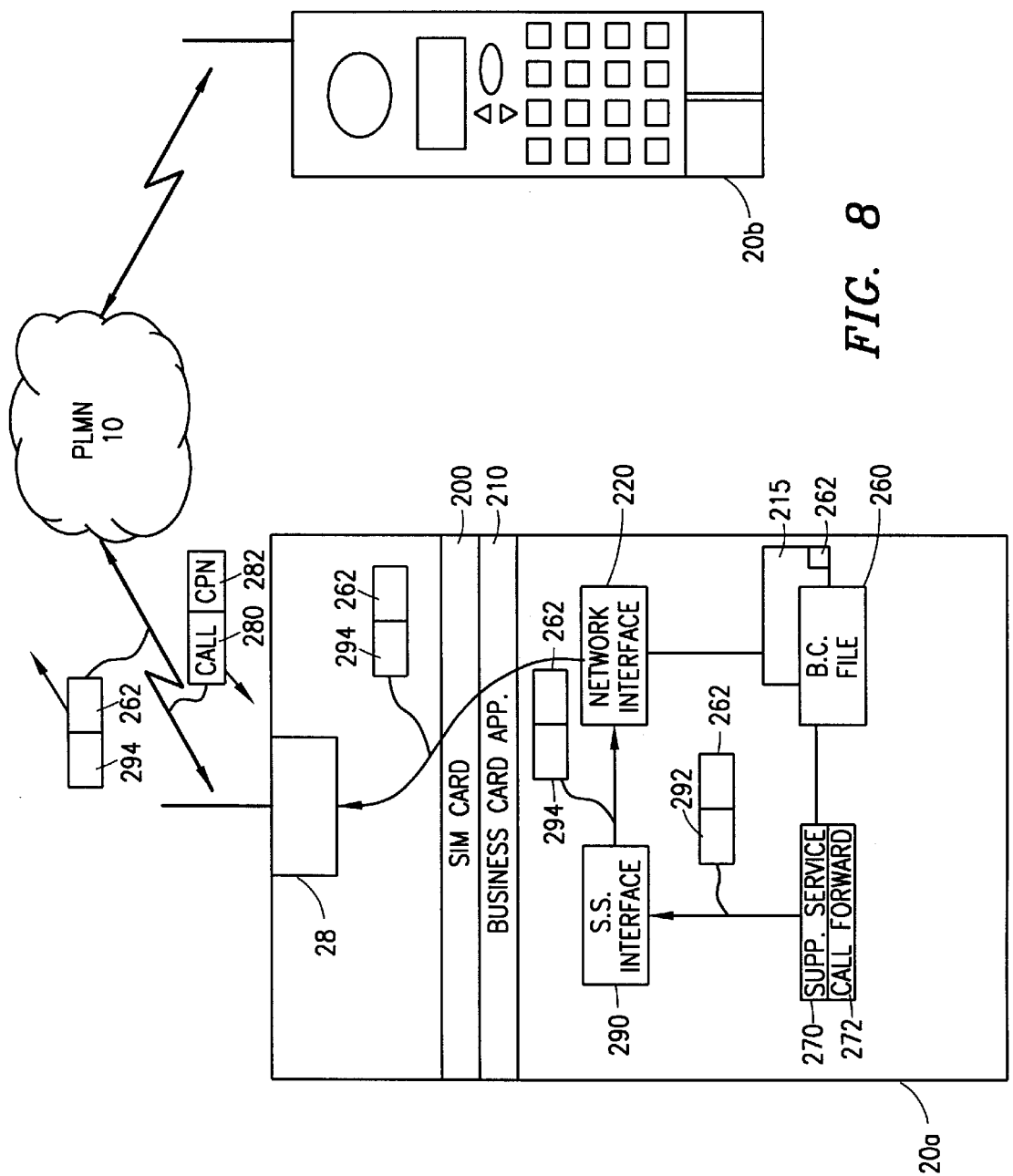
FIG. 8 illustrates a sample enhanced network-based call forwarding service utilizing business card information within a mobile station in accordance with embodiments of the present invention.

For example, as shown in FIG. 8 of the drawings, after the MS 20 receives business card information 215 from another MS 20b, the mobile subscriber associated with the receiving MS 20a can store, in the business card file 260, a forwarding number 262 specific to that individual business card information 215. Thereafter, when a call 280 is received from that MS 20b through the cellular network 10, the call forwarding interface 272 within the supplementary service application 270 can access the business card file 260 and retrieve the forwarding number 262. The call forwarding interface 272 within the supplementary service application 270 can transmit this forwarding number 262 within a call forwarding request 292 to the supplementary service interface 290, which can convert the call forwarding request 292 into the call forwarding command 294, which includes the call forwarding number 262. The supplementary service interface 290 transmits this call forwarding command 294 to the cellular network 10 through the network interface 220 and transceiver circuitry 28 within the MS 20a for forwarding of the call 280 to the designated call forwarding number 262.

Figure 9:
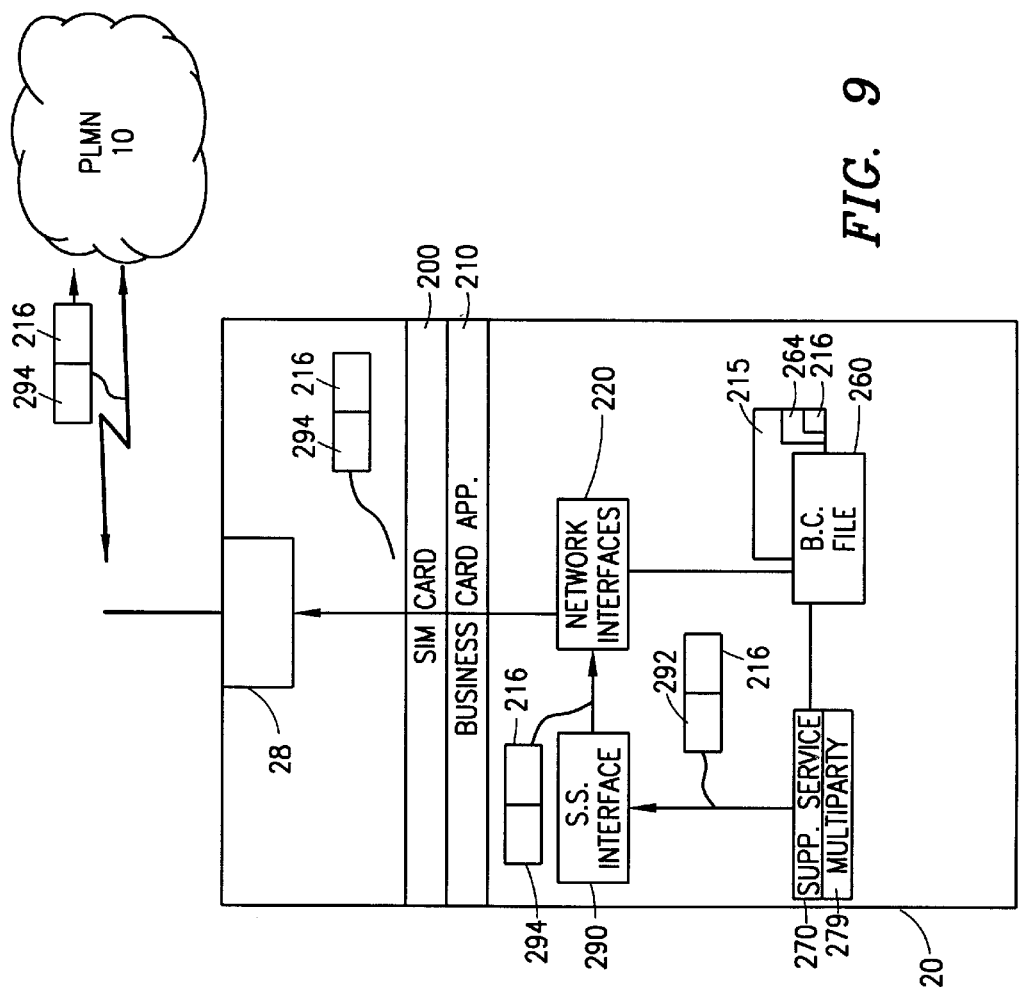
FIG. 9 illustrates a sample enhanced network-based multiparty calling service utilizing business card information within a mobile station in accordance with embodiments of the present invention.

Multiparty calling can be implemented in a similar manner. As illustrated in FIG. 9 of the drawings, the mobile subscriber associated with the calling MS 20 can associate several business card information 215 within the business card file 260 together to create a multiparty group 264. When the mobile subscriber associated with the calling MS 20 wants to make a multiparty call, instead of selecting each business card information or dialing each number separately, the mobile subscriber can instruct the multiparty calling 279 interface within the supplementary service application 270 to access the business card file 260 and send a multiparty calling request 292 including the telephone numbers 216 associated with each business card information 215 within the multiparty group 264 to the supplementary service interface 290 to attempt to setup a multiparty call to each of the parties associated with the telephone numbers 216 through the cellular network 10. The supplementary service interface 290 can transform the request 292 into a multiparty supplementary service command 294, which includes the telephone numbers 216 and transmit this command 294 to the cellular network 10 via transceiver circuitry 28 within the MS 20.

Figure 10:
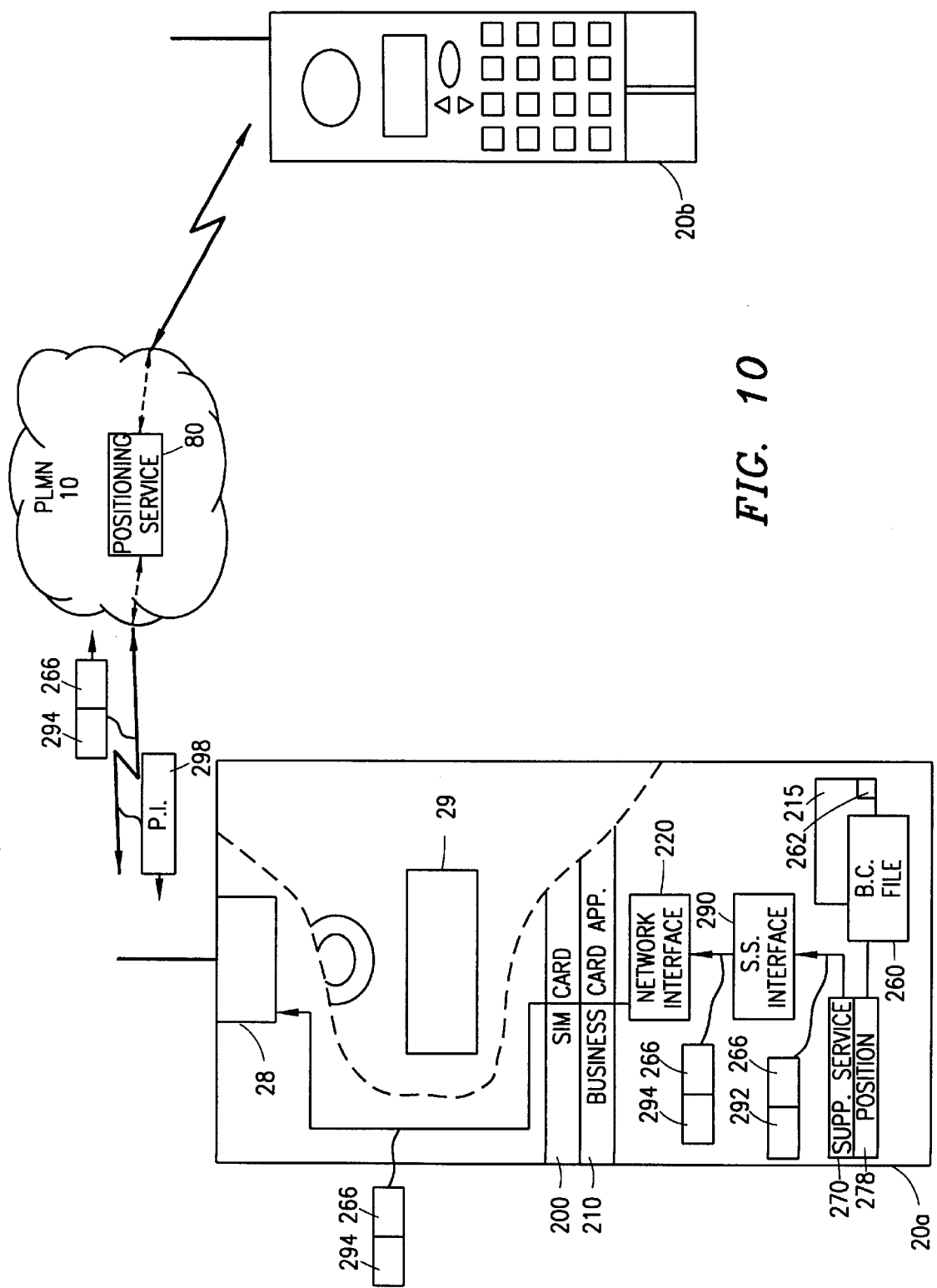
FIG. 10 illustrates a sample enhanced network-based positioning service utilizing business card information within a mobile station in accordance with embodiments of the present invention.

Positioning services can also be enhanced by the supplementary service application 270 within the business card application 210. For example, with reference now to FIG. 10 of the drawings, the mobile subscriber associated with a requesting MS 20a can send a positioning command 294 for an MS 20b having its business card information 215 stored within the business card file 260. If the business card information 215 includes a mobile telephone number 266, the positioning interface 278 within the supplementary service application 270 can retrieve this mobile number 266 and send it in a positioning request 292 to the supplementary service interface 290 for conversion into a positioning command 294 including this mobile number 266. The supplementary service network interface 290 can transmit this positioning command 294 to positioning services 80 within the cellular network 10 via the network interface 220 and transceiver circuitry 28 within the requesting MS 20a. If the MS 20b associated with the retrieved mobile number 266 is positioned, positioning information 298 associated with the geographical location of the positioned MS 20b can be returned to the requesting MS 20a from the positioning services 80 via the supplementary service interface 290 and supplementary service application 270 for display to the mobile subscriber on the requesting MS display 29.

Alternatively, the positioning interface 278 within the supplementary service application 270 can also enhance positioning of the requesting MS 20a itself. This can be useful if the mobile subscriber becomes lost on the way to one of the parties having business card information 215 stored in the business card file 260. The mobile subscriber can access the positioning interface 278 within the supplementary service application 270 and request directions to the address associated with the desired business card information 215 based upon the requesting MS's 20a current location. The positioning interface 278 within the supplementary service application 270 can send a positioning request 292 along with the requesting MS's 20a telephone number and the selected address (not shown) to the supplementary service interface 290, which can convert and transmit the positioning command 294 to positioning services 80 within the cellular network 10. After the requesting MS 20a has been positioned, the positioning information 298, such as a map or list of directions (turn right at Field, go one mile, turn left on Ross), can be returned to the requesting MS 20a and displayed on the display 29 thereon.

Alternatively, the mobile subscriber can request the positioning interface 278 within the supplementary service application 270 to position the MS 20a and display all of the business card information 215 that has an address close to the present location of the requesting MS 20a. The positioning interface 278 within the supplementary service application 270 can send the positioning request 292 to the supplementary service interface 290, as before, but when the positioning information 298 returns, e.g., at least city and state information, and possibly zip code information, the positioning interface 278 within the supplementary service application 270 can sort the business card information 215 by city, state and possibly zip code and display the business card information 215 that matches the received city, state and zip code information.

Figure 11:
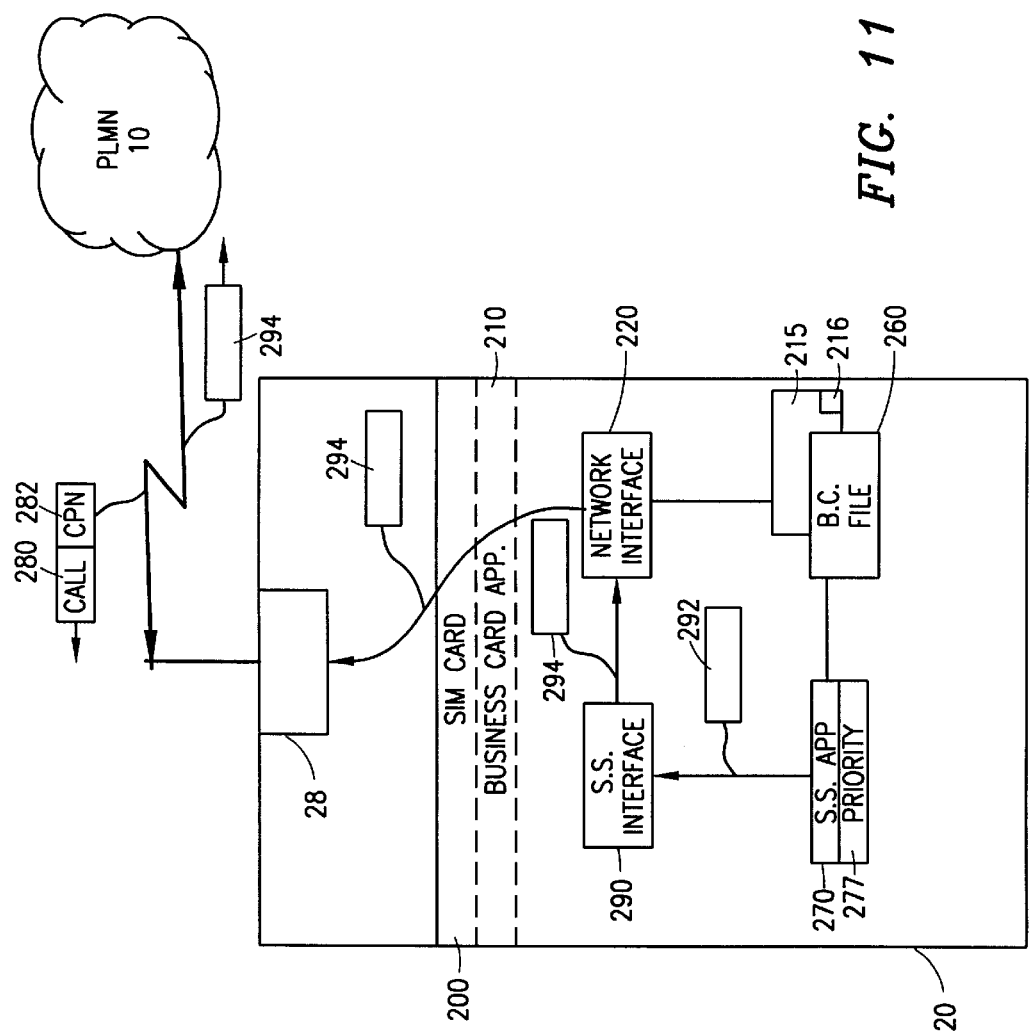
FIG. 11 illustrates a sample enhanced network-based call priority service utilizing business card information within a mobile station in accordance with embodiments of the present invention.
Figure 12:
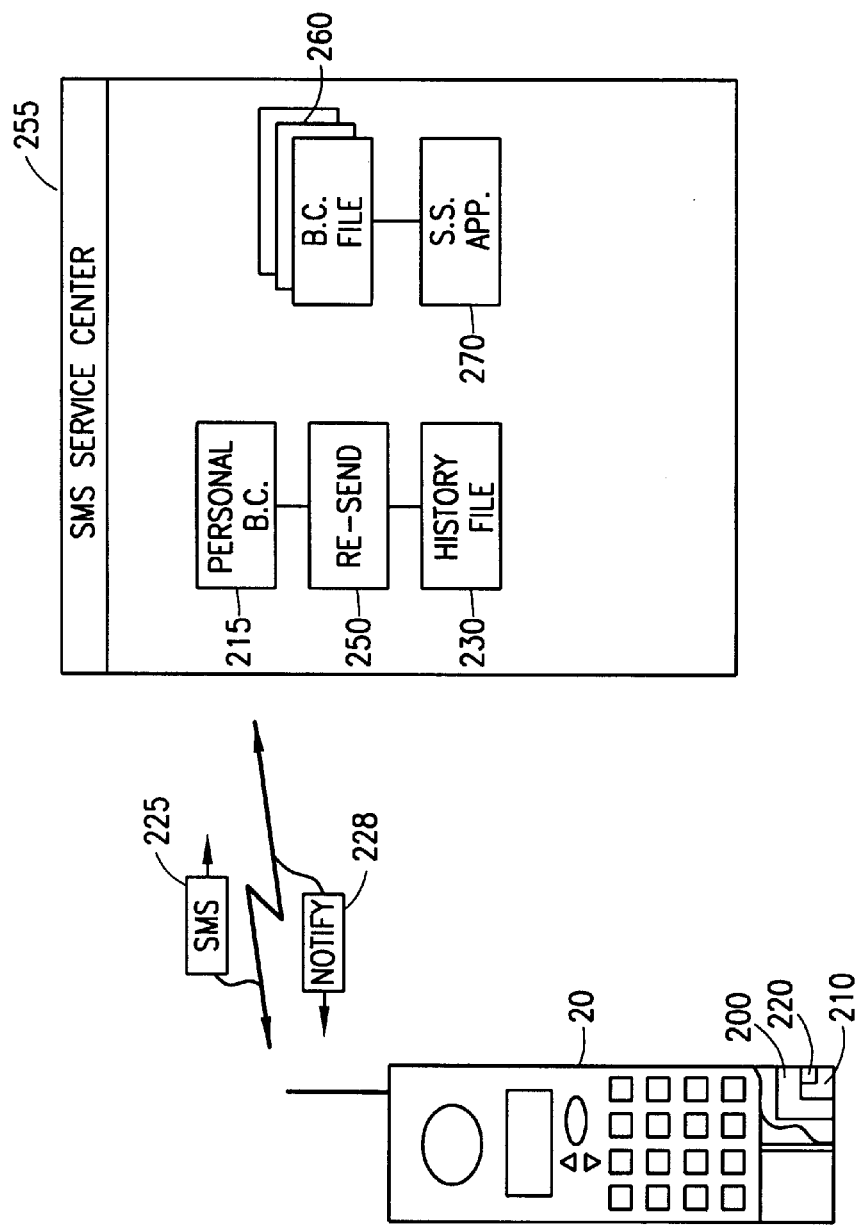
FIG. 12 illustrates the implementation of various applications associated with the business card application services within a Short Message Service Center in accordance with alternative embodiments of the present invention.

As shown in FIG. 11 of the drawings, call priority services provided by the network 10 can also be enhanced by the supplementary service application 270 within the business card application 210. If the called mobile subscriber subscribes to the call priority service, when the called MS 20 receives an incoming call 280 and associated calling party number 282, the call priority interface 277 within the supplementary service application 270 can compare the received calling party number 282 with the telephone numbers 216 associated with the business card information 215 stored within the business card file 260.

If the calling party number 282 matches either any one of the telephone numbers 216 or one of the telephone numbers 216 marked as a priority, the call priority interface can send a call priority request 292 to the supplementary service interface 290, which can convert the call priority request 292 into the call priority command 294. The supplementary service interface 290 transmits this call priority command 294 to the cellular network 10 through the network interface 220 and transceiver circuitry 28 within the MS 20. Thereafter, if the network 10 experiences any difficulties, the call 282 will not be preempted and will be allowed to continue, if possible.

In an alternative embodiment, as shown in FIG. 11 of the drawings, various applications associated with the business card service, such as the personal business card information 215, re-send application 250, history file 230, business card file 260 and supplementary service application 270 can be located in another network node 255 instead of within the MS 20. This can be a new node or an SMS Service Center 255, the latter being illustrated.

When the mobile subscriber wants to update the mobile subscriber's personal business card information 215 or utilize the stored business card information 260 of other mobile subscribers, the business card application 210 within the MS 20 sends an SMS message 225 via the network interface 220 to the SMS Service Center 255 requesting access to the various applications associated with the business card service of the MS 20. The SMS Service Center 255 may require the MS 20 to provide a password or other type of authentication before allowing access to the various business card applications.

In addition, when business card information associated with other mobile subscribers is received by the SMS Service Center 255 and stored in the business card file 260, a notification message 228 can be sent to the business card application 210 within the MS 20, which includes the received business card information for the mobile subscriber to review. By implementing various business card applications within the SMS Service Center 255, this reduces the amount of memory space that the SIM card 200 needs to allocate to the business card application 210.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A method for providing enhanced business card services to mobile subscribers within a cellular network, comprising the steps of:

storing, by business card functionality associated with a first mobile station of a plurality of mobile stations in wireless communication with said cellular network, personal business card information associated with said first mobile station within said business card functionality;

transmitting said personal business card information from said business card functionality to at least a second mobile station of said plurality of mobile stations;

storing historical data within said business card functionality when said first mobile station transmits said personal business card information to said at least one additional mobile station;

updating said personal business card information by said first mobile station; and re-sending said personal business card information to said second mobile station using said historical data.

2. The method of claim 1, wherein said step of transmitting further comprises the steps of:

accessing, by said first mobile station, said business card functionality stored within a memory within said first mobile station;

entering a B-number associated with said second mobile station;

retrieving said personal business card information by said business card functionality;

sending, by said business card functionality, said personal business card information and said B-number to a network interface associated with said business card functionality;

sending, by said network interface, said personal business card information and said B-number to transceiver circuitry within said first mobile station;

transmitting, by said transceiver circuitry, said personal business card information and said B-number to said cellular network over an air interface; and transmitting, by said cellular network, said personal business card information to said second mobile station, using said B-number.

3. The method of claim 2, wherein said step of sending said personal business card information from said network interface to said transceiver circuitry further comprises the steps of:

converting, by said network interface, said personal business card information into a Short Message Service message; and sending said Short Message Service message and said B-number from said network interface to said transceiver circuitry.

4. The method of claim 3, wherein said step of transmitting said personal business card information from said transceiver circuitry to said cellular network further comprises the step of:

transmitting, by said transceiver circuitry within said first mobile station, said personal business card information and said B-number to a Short Message Service Center within said cellular network via a mobile switching center in wireless communication with said first mobile station.

5. The method of claim 1, wherein said step of storing historical data further comprises the steps of:

logging said transmission of said personal business card information to said second mobile station in a history file within said business card functionality;

recording time information associated with said transmission; and recording destination information associated with said second mobile station.

6. The method of claim 5, wherein said step of re-sending said updated personal business card information further comprises the steps of:

accessing said history file to obtain said destination information associated with said second mobile station;

transmitting said destination information and said updated personal business card information to a network interface within said first mobile station associated with said business card functionality, said business card functionality being stored within a memory within said first mobile station;

transmitting said destination information and said updated personal business card information from said network interface to transceiver circuitry within said first mobile station;

transmitting, by said transceiver circuitry, said destination information and said updated personal business card information to said cellular network; and transmitting, by said cellular network, said updated personal business card information to said second mobile station using said destination information.

7. The method of claim 5, wherein said step of storing historical data further comprises the step of:

storing an update indication along with said destination information in said history file.

8. The method of claim 7, wherein said step of re-sending further comprises the step of:

re-sending said personal business card information to said second mobile station using said historical information when said update indication is set.

9. The method of claim 1, wherein said step of updating further comprises the steps of:

accessing, by said first mobile station, a display and edit functionality within said business card functionality;

displaying said personal business card information using said display and edit functionality;

creating said updated personal business card information using an interface on said first mobile station; and storing said updated personal business card information in said business card functionality.

10. The method of claim 1, wherein said step of updating further comprises the steps of:

sending a short message service message containing said updated personal business card information from said first mobile station to a Short Message Service Center in wireless communication with said first mobile station; and storing said updated personal business card information within said business card functionality within said Short Message Service Center.

11. The method of claim 10, wherein said step of re-sending further comprises the steps of:

accessing a history file containing said historical data within said business card functionality within said Short Message Service Center, said historical data including destination information associated with said second mobile station;

retrieving said destination information; and re-sending said updated personal business card information from said Short Message Service Center to said second mobile station using said destination information.

12. A method for providing enhanced supplementary services to a mobile subscriber associated with a first one of a plurality of mobile stations in wireless communication with a cellular network, said method comprising the steps of:

receiving, by said business card functionality associated with said first mobile station, business card information from second mobile station;

storing received business card information in a business card functionality;

interfacing, by supplementary service functionality associated with said business card functionality, said received business card information with a supplementary service associated with said first mobile station; and performing, by said supplementary service functionality, said supplementary service associated with said first mobile station in response to said business card information stored in said business card functionality.

13. The method of claim 12, wherein said supplementary service is a caller ID service, and wherein step of enhancing said supplementary services further comprises the steps of:

receiving an incoming call to said first mobile station, said incoming call having a calling party number associated therewith;

comparing said received calling party number with telephone number information within said received business card information associated with said second mobile station;

determining a matching one of said second mobile station associated with said telephone number information that matches said calling party information; and displaying said received business card information on said first mobile station for said matching additional mobile station in addition to caller ID information associated with said caller ID service.

14. The method of claim 12, wherein said supplementary service is a call blocking service, and wherein said step of enhancing further comprises the steps of:

receiving an incoming call to said first mobile station, said incoming call having a calling party number associated therewith;

comparing said calling party number with telephone number information within said received business card information associated with said second mobile station; and blocking said incoming call from ringing said first mobile station when said calling party number does not match any of said telephone number information.

15. The method of claim 12, wherein said supplementary service is a network supported supplementary service, and wherein said step of enhancing further comprises the steps of:

receiving a request from said supplementary service functionality;

converting said request into a supplementary service command; and transmitting said supplementary service command to said cellular network.

16. The method of claim 15, wherein said step of transmitting said supplementary service command to said cellular network further comprises the steps of:

transmitting said supplementary service command from a supplementary service interface within said first mobile station to a network interface within said business card functionality;

transmitting said supplementary service command from said network interface to transceiver circuitry within said first mobile station; and transmitting, by said transceiver circuitry, said supplementary service command to said cellular network.

17. The method of claim 15, wherein said supplementary service is a call forwarding service, and wherein said step of enhancing further comprises the steps of:

storing with selected ones of said received business card information a respective forwarding number;

receiving an incoming call to said first mobile station, said incoming call having a calling party number associated therewith;

comparing said calling party number with telephone number information within said selected ones of said received business card information;

determining a matching one of said received business card information that has telephone number information that matches said calling party number;

retrieving said forwarding number from said matching received business card information; and transmitting said forwarding number associated with said matching business card information to said supplementary service interface for transmission to said cellular network.

18. The method of claim 15, wherein said supplementary service is a multiparty calling service, and wherein said step of enhancing further comprises the steps of:

associating select ones of said received business card information to create a multiparty group;

initiating a call to said multiparty group by transmitting a telephone number for each said select business card information to said supplementary service interface for transmission to said cellular network.

19. The method of claim 15, wherein said supplementary service is a positioning service, and wherein said step of enhancing further comprises the steps of:

retrieving telephone number information from a selected one of said received business card information;

transmitting said telephone number information to said supplementary service interface for transmission to said cellular network;

receiving positioning information; and displaying said positioning information on said first mobile station.

20. The method of claim 15, wherein said supplementary service is a positioning service, and wherein said step of enhancing further comprises the steps of:

transmitting a positioning request for said first mobile station to said cellular network;

receiving positioning information; and displaying data associated with said positioning information on said first mobile station.

21. The method of claim 20, wherein said step of displaying further comprises the steps of:

accessing said received business card information;

determining matching ones of said received business card information that include information that matches said received positioning information; and displaying said matching received business card information on a display of said first mobile station.

22. The method of claim 15, wherein said supplementary service is a call priority service, and wherein said step of enhancing further comprises the steps of:

receiving an incoming call to said first mobile station, said incoming call having a calling party number associated therewith;

comparing said calling party number with telephone number information within said selected ones of said received business card information;

if said calling party number matches one of said telephone number information, transmitting a call priority request to said supplementary service interface for transmission to said cellular network.

23. A mobile station in wireless communication with a cellular network for providing enhanced business card services, comprising:

transceiver circuitry for transmitting personal business card information associated with said mobile station to at least an additional mobile station; and a business card functionality for storing said personal business card information associated with said mobile station, said business card functionality further storing historical data responsive to transmission of said personal business card information to said additional mobile station.

24. The mobile station of claim 23, further comprising:

means for updating said personal business card information; and means for sending said updated personal business card information to said additional mobile station using said historical data in response to updating said personal business card information.

25. The mobile station of claim 23, further comprising:

a network interface associated with said business card functionality for receiving said personal business card information and a B-number associated with said additional mobile station from said business card functionality.

26. The mobile station of claim 25, wherein said network interface further comprises:

means for converting said personal business card information into a Short Message Service message, said Short Message Service message and said B-number being transmitted from said network interface to said transceiver circuitry.

27. The mobile station of claim 23, further comprising:

a history file within said business card functionality for storing said historical data, said historical data further including time information associated with the transmission of said personal business card information and destination information associated with said additional mobile station.

28. The mobile station of claim 27, wherein said historical data further includes an update indication, said updated personal business card information being re-sent when said update indication is set.

29. The mobile station of claim 23, further comprising:

at least one function key on a keypad responsive to user input; and a display and edit functionality within said business card functionality for updating said personal business card information in response to said at least one function key.

30. The mobile station of claim 23, wherein said business card functionality further receives and stores business card information from said additional mobile station, said received business card information.

31. The mobile station of claim 30, further comprising:

a supplementary service functionality associated with said business card functionality for interfacing said received business card information with a supplementary service associated with said mobile station.

32. The mobile station of claim 31, wherein said supplementary service comprises at least one of a caller ID service and a call blocking service.

33. The mobile station of claim 31, wherein said supplementary service is a network supported supplementary service, and further comprising:

a supplementary service interface associated with said business card functionality for receiving a request from said supplementary service functionality, converting said request into a supplementary service command and transmitting said supplementary service command to said cellular network.

34. The mobile station of claim 33, wherein said supplementary service comprises at least one of a call forwarding service, a multiparty service, a call priority service and a positioning service.

* * * * *

UNITED STATES PATENT AND TRADEMARK OFFICE
CERTIFICATE OF CORRECTION

PATENT NO. : 6,175,741 B1
DATED : January 16, 2001
INVENTOR(S) : Vladimir Alperovich et al.

It is certified that error appears in the above-identified patent and that said Letters Patent is hereby corrected as shown below:

<u>Column 9,</u>
Line 23, replace "one additional" with -- second --

<u>Column 11,</u>
Lines 14 and 15, replace "by said business card functionality associated with" with -- at --

Signed and Sealed this

Sixteenth Day of October, 2001

Attest:

*Nicholas P. Godici*

NICHOLAS P. GODICI
*Attesting Officer*     *Acting Director of the United States Patent and Trademark Office*